March 26, 1935. E. C. LEWIS 1,995,570
PISTON ROD CONNECTION
Filed Nov. 16, 1933
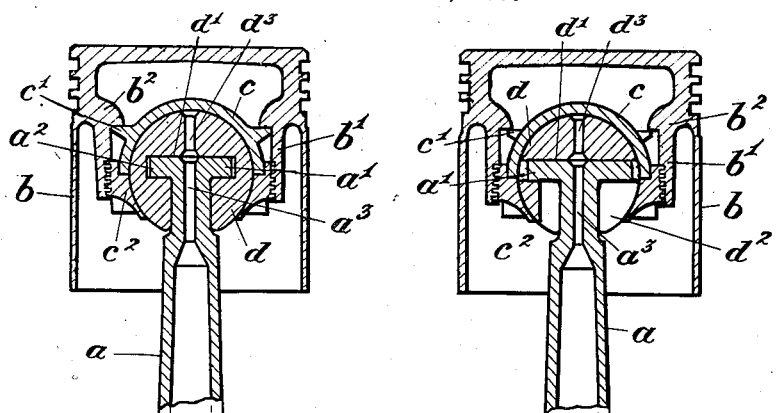
Fig.1. Fig.2.
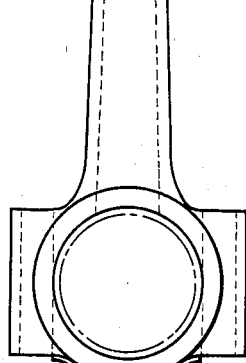
Fig.3. Fig.4.
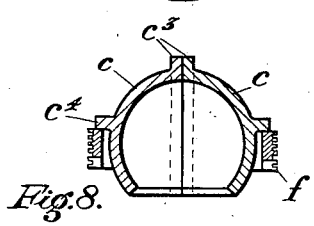
Fig.5. Fig.6.
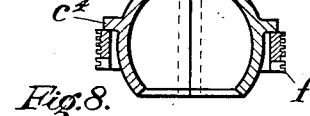
Fig.8.
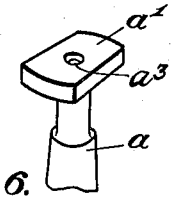
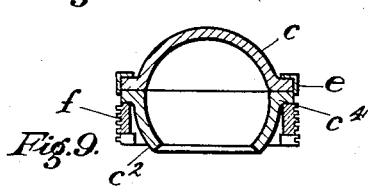
Fig.7.
Fig.9.
Inventor:-
Eric Crisp Lewis.
by Richard E. Babcock
Attorney

Patented Mar. 26, 1935

1,995,570

UNITED STATES PATENT OFFICE 1,995,570

PISTON ROD CONNECTION

Eric Crisp Lewis, Coventry, England

Application November 16, 1933, Serial No. 698,352
In Great Britain November 26, 1932

6 Claims. (Cl. 287—87)

This invention relates to certain improvements in and modifications of the invention set forth in the specification of my prior Patent No. 1,914,268 and more particularly of the construction therein described in which the pivotal centre of the universal connection between the piston and connecting rod is fixed in relation to the piston and wherein provision is made for limited relative movement between the piston and the connecting rod in a direction parallel with the axis of the crank-shaft.

In the particular construction above referred to the ball is divided into two parts in a plane at right angles to the axis of the connecting rod, and the lower section is sub-divided to facilitate its assembly about the head of the connecting rod. In this case relative movement between the piston and the connecting rod in a direction parallel with the axis of the crank-shaft is provided for by forming the contacting faces of the upper ball section and the head of the connecting rod with a tongue and groove engagement.

The object of the present invention is to produce a piston and connecting rod assembly which is at once lighter, stronger, more efficient and less expensive than that described in the prior patent and hereinbefore referred to.

According to this invention the ball, instead of being made in three sections as described in the prior patent, is now made either in one piece or in halves divided in a plane containing the axis of the connecting rod. The former tongue and groove engagement between the ball and the head of the connecting rod is dispensed with, relative translatory movement between the head and the ball being confined to a direction parallel with the axis of the crank-shaft by slotting the ball in that direction, and forming the said head and/or the adjacent part of the neck of the connecting rod with flat sides parallel therewith.

The invention also includes certain improvements in the socket for the ball, designed with a view to reduce or eliminate the risk of fracture under the severe stresses imposed upon it under service conditions.

In the accompanying drawing,

Figure 1 is a sectional view of a piston illustrating the improved form of universal joint, the section being taken at right angles to the axis of the crank-shaft.

Figure 2 is a similar view at right angles thereto.

Figures 3, 4 and 5 are detail sectional views of the one-piece ball used in the joint shown in Figures 1 and 2, Figure 5 being a sectional plan view thereof.

Figure 6 is a general view of the head of the connecting rod.

Figure 7 illustrates a further modification of the universal joint in which the ball is made in halves adapted for assembly about the head of the connecting rod in a lateral direction.

Figures 8 and 9 are detail views illustrating alternative constructions of ball socket.

Throughout the drawing like parts are designated by similar reference characters.

Referring to the drawing, $a$ represents the connecting rod and $b$, the piston which can be die-cast in any suitable alloy with an internal central tubular member $b^1$ to receive the socket $c$ for the ball $d$.

As will be seen, the piston is of a lighter construction than that shown in the prior patent, the member $b^1$ springing from the lower part of the piston head instead of depending from the crown of the piston. Besides the reduction in weight which is obtained in this way there is less tendency for the said member, and hence the socket carried thereby, to get unduly hot.

In the construction shown in Figures 1 and 2 the socket $c$ is divided into upper and lower sections and the inner end of the bore of the tubular member $b^1$ is formed with a shoulder $b^2$ which provides an abutment for an annular flange or series of projections $c^1$ formed around the upper section of the socket $c$. The said flange or projections $c_1$, besides providing a positive location for the socket, also in effect reinforces the upper section thereof against the considerable tensional stresses to which it is subject when the engine is running. Alternatively, these stresses may be reduced by dividing the socket in a plane which is offset from the geometrical centre of the joint in the direction of the piston crown, as shown in Figure 9, in which case the joint between the sections $c$, $c^2$ can be made oiltight by means of a flanged ring $e$. Or the said stresses can be avoided entirely by dividing the socket $c$ in a plane containing the axis of the piston, as represented in Figure 8, the adjacent edges $c^3$ being flanged and abutting against each other.

The lower socket section $c^2$ may, as seen in Figures 1 and 2, be spigoted to receive the free edge of the upper section $c$ and may be formed externally with a screw thread adapted to engage with the correspondingly screw-threaded outer end of the bore of the member $b^1$, in which case its outer end may be castellated or otherwise formed to facilitate the operation of screwing it into position in the member $b^1$. Instead of screwing the section $c^2$ into the member $b^1$ it may be secured in position therein by means of a sleeve nut $f$, as shown in Figures 8 and 9, the nut abutting against a flange $c^4$ on the section $c^2$ and engaging a screw thread in the bore of the member $b^1$.

In the construction shown in Figures 1 to 5, the ball $d$ is made in one piece of metal or alloy and is slotted through at $d^1$ in a direction parallel with the axis of the engine crank-shaft to receive the flat head $a^1$ of the connecting rod $a$ (Figure 6), the engagement of which with the ball is effected in a lateral direction through the open end of a slot $d^2$ (Figures 2-5) cut in the ball at right angles to the slot $d^1$ and of such form, as shown, to accommodate the neck of the rod below the head. The said head of the connecting rod is made a free sliding fit in the slot $d^1$ being formed with parallel flat sides $a^2$ so that relative translatory movement between the head and the ball is confined to a direction parallel with the axis of the engine crank-shaft. Alternatively, or in addition to the flat sides on the head, the adjacent part of the neck of the connecting rod may be formed with similar flat sides to co-operate with the sides of slot $d^2$. The open ends of the slot $d^1$ may be closed in any suitable manner, as by means of a split spring ring (not shown) introduced into a groove cut around the ball in the plane of the said slot. This will effectually prevent any tendency for the lubricating oil, in passing from the oil conduit $a^3$ in the head of the connecting rod to the oil-duct $d^3$ in the upper part of the ball to be by-passed between the head and the slot $d^1$ in the ball.

Where the ball $d$ is made in halves, as shown in Figure 7, it is divided in a plane parallel with the axis of the engine crank-shaft and containing the axis of the connecting rod and the flat face of each half is recessed at $d^4$ to accommodate one half of the head $a^1$ and neck of the connecting rod $a$ the two halves of the ball being assembled about the head in a lateral direction and, if necessary, held together by means of a split spring ring (not shown) taking a seating in a groove cut around the ball in a plane at right angles to the plane of division. Here also the formation of the recesses and of the head of the connecting rod is such that relative translatory movement between the head and ball can take place only in a direction parallel with the axis of the engine crank-shaft.

The head of the connecting rod may, if desired, be made as a separate part instead of being integral with the rod, in which case it can be inserted in a slot cut through the ball in the direction of the axis of the engine crank-shaft, the end of the connecting rod being inserted through a hole formed in the solid ball below and at right angles to said slot, and subsequently secured to the head in any suitable manner, as by means of a screw thread engagement with a locking pin passed through the two parts.

I claim:—

1. A universal coupling comprising a female member and a male member in combination with a pair of planospherical blocks disposed in the socket of said female member and having their opposed plane faces parallel with the axis of said male members and each formed with two grooves at right angles to each other one of said grooves extending diametrically across the plane face, and a head element rigidly attached to said male member and having flat sides engaging the diametrical grooves in the said blocks whereby said female member and said blocks may move bodily out of alignment with said male member.

2. A universal coupling comprising a male member and a female member divided in a plane parallel with the axis of said male member, in combination with a ball member disposed in the socket of said female member and formed with a diametrical slot disposed at right angles to the axis of said male member and an opening extending at right angles to the plane of said slot from the latter through the surface of said ball, and a head element rigidly connected to said male member and having flat sides engaging the sides of said slot whereby said female member together with said ball may move bodily out of alignment with said male member, said male member extending from said head through said opening, and said opening being of greater dimension in the direction of the length of said slot than the corresponding cross-sectional dimension of that portion of said male member disposed in said opening.

3. A universal coupling comprising a divided female member having its concave operative face continuous in area and of spheroidal form, and a male member, in combination with a spheroidal form ball snugly slidably and positively held in said female member for relative rotary movement between said ball and female member about the axis of said male member, said ball being formed with a diametrical slot disposed at right angles to the axis of said male member and a connecting slot extending at right angles to the plane of said diametrical slot and from the latter through the surface of said ball and being disposed lengthwise of said diametrical slot, the walls defining the sides of said diametrical slot being straight and parallel, and said male member extending through said connecting slot and having a head portion snugly slidably received in said diametrical slot and formed with straight side faces slidably engaging and guided by the said walls, whereby said female member and ball may move bodily out of alignment with said male member.

4. A universal coupling comprising a divided female member having its concave operative face continuous in area at all points and of spheroidal form, and a male member, in combination with a one-piece spheroidal form ball snugly slidably and positively held in said female member for relative rotary movement between said ball and female member about the axis of said male member, said ball being formed with a diametrical slot disposed at right angles to the axis of said male member, and a connecting slot disposed at right angles to the plane of said diametrical slot and extending lengthwise of the latter from one open end of the latter to a point adjacent the other end thereof and in a direction at right angles thereto extending throughout its length from said diametrical slot through the surface of said ball, the width of said diametrical slot being such as to leave webs on each side thereof and the length of said connecting slot being such as to leave a connecting web at one end, the said male member in assembled relation extending through said connecting slot and having a head rigidly connected to it and slidably disposed in said diametrical slot and having its portion received in said connecting slot of such cross-sectional size as to be slidably received therein through the open end thereof, and said head being of less length than said diametrical slot and having straight side edges slidably cooperating with the opposed sides of said slot, whereby said female member and said ball may move bodily out of alignment with said male member, and whereby relative rotary movement between said ball and male member will be prevented.

5. A universal coupling comprising a divided female member having its concave operative face continuous in area at all points and of spheroidal form, and a male member, in combination with a one-piece spheroidal form ball snugly slidably and positively held in said female member for relative rotary movement between said ball and female member about the axis of said male member, said ball being formed with a diametrical slot disposed at right angles to the axis of the male member and a connecting slot disposed at right angles to the plane of said diametrical slot and extending lengthwise of the latter and from said diametrical slot through the surface of said ball, the said male member in assembled relation extending through said connecting slot and having a head rigidly connected to it and slidably disposed in said diametrical slot and having its portion received in said connecting slot of such cross-sectional size as to be slidable in said connecting slot lengthwise of the latter, and said head being of less length than said diametrical slot and having straight side edges slidably cooperating with the side walls defining the sides of said diametrical slot.

6. A universal coupling comprising a divided female member having its concave operative face continuous in area at all points and of spheroidal form, and a male member, in combination with a one-piece spheroidal form ball snugly slidably and positively held in said female member for relative rotary movement between said ball and female member about the axis of said male member, said ball being formed with a slot extending in a diametric direction with relation thereto and having an open end, and a connecting opening disposed at right angles to the plane of said slot and extending from said slot through the surface of said ball, the said male member in assembled relation extending through said connecting opening and having a head rigidly connected to it and slidably disposed in said slot and having its portion received in said connecting opening of such cross-sectional size as to be capable of movement in said opening lengthwise of said slot, and said ball and male member being formed with cooperating portions preventing their relative rotary movement.

ERIC C. LEWIS.